US005786086A

United States Patent [19]

Frihart et al.

[11] Patent Number: 5,786,086

[45] Date of Patent: Jul. 28, 1998

[54] CONDUCTIVE WIRE COATING

[75] Inventors: Charles Richard Frihart, Lawrenceville, N.J.; Joseph Kliwinski, Newtown, Pa.

[73] Assignee: Union Camp Corporation, Princeton, N.J.

[21] Appl. No.: 581,782

[22] Filed: Jan. 2, 1996

[51] Int. Cl.[6] .............................. B32B 15/00; B05D 3/02; H01B 7/00

[52] U.S. Cl. .............................. 428/379; 428/375; 428/383; 427/117; 427/120; 427/388.5; 427/372.2; 427/384; 174/110 N; 174/110 SR

[58] Field of Search .............................. 427/117, 120, 427/372.2, 384, 553, 388.5; 428/379, 375, 383; 525/435, 420.5, 426; 522/164; 174/110 SR, 110 N

[56] References Cited

U.S. PATENT DOCUMENTS

| | | | |
|---|---|---|---|
| 3,157,681 | 11/1964 | Fischer | 260/407 |
| 3,377,303 | 4/1968 | Peerman et al. | 260/18 |
| 4,031,287 | 6/1977 | Suzuki et al. | 428/379 |
| 4,159,920 | 7/1979 | Andersson et al. | 156/54 |
| 4,234,624 | 11/1980 | Linderoth et al. | 427/55 |
| 4,342,794 | 8/1982 | Völker et al. | 427/54.1 |
| 4,391,848 | 7/1983 | Hilker | 427/118 |
| 4,400,430 | 8/1983 | Miyake et al. | 428/379 |
| 4,420,535 | 12/1983 | Walrath et al. | 428/379 |
| 4,489,130 | 12/1984 | Hilker | 428/379 |
| 4,505,978 | 3/1985 | Smith | 428/379 |
| 4,614,670 | 9/1986 | Lavallee | 427/118 |
| 4,631,201 | 12/1986 | Lavallee | 427/118 |
| 4,726,993 | 2/1988 | Zaopo | 428/379 |
| 4,775,726 | 10/1988 | Lavallee | 525/420 |
| 4,808,477 | 2/1989 | Harber | 427/117 |
| 4,975,498 | 12/1990 | Frihart | 525/420.5 |
| 4,987,160 | 1/1991 | Frihart et al. | 522/164 |
| 5,155,177 | 10/1992 | Frihart | 525/420.5 |
| 5,254,806 | 10/1993 | Gross et al. | 174/133 R |

*Primary Examiner*—Patrick Ryan
*Assistant Examiner*—J. M. Gray
*Attorney, Agent, or Firm*—Woodcock Washburn Kurtz Mackiewicz & Norris LLP

[57] ABSTRACT

A conductive wire coated with an improved electrical insulation and methods for the preparation of same. The methods involve coating a conductive wire with an insulating material that comprises a curable acrylate-modified aminoamide resin. The insulated conductive wires possess highly desirable properties, including, for example, desirable dielectric strength, heat-resistance, flexibility, mechanical properties and/or uniformity.

37 Claims, No Drawings

CONDUCTIVE WIRE COATING

FIELD OF THE INVENTION

This invention relates to conductive wires coated with an improved electrically insulating material. More particularly, the present invention relates to conductive wires coated with an acrylate-modified aminoamide resin.

BACKGROUND OF THE INVENTION

Conductive wire is an integral part of electrical equipment, including transformers, motors, ballasts and the like. The term "conductive wire" or "conductor", as used herein, refers to a single conductor, for example, copper, as well as multiple conductors which are wound together or otherwise arranged proximate each other. In use, the conductors are typically wound jointly to form a coil.

Conductive wire is typically covered or coated with an insulating material, for example, a polymeric material, to provide electrical insulation and to impart a separation distance between adjoining wires. Properties which are generally important in insulating materials include: high dielectric strength to avoid electrical shorts; uniformity, as measured by a minimum number of faults or defects; good mechanical strength (toughness) and/or structural integrity (hardness); flexibility to permit working of the coated wire; and good heat resistance to prevent decomposition and/or melting from exposure to elevated temperatures and temperature cycling during, for example, ballast production and/or end use applications (current flow). Good mechanical strength is especially important in connection with magnet wires that are wound repeatedly around a mandrel. It is important also that such wires be non-tacky and smooth and that they possess good slip qualities to improve handling during winding operations.

The main purpose of the coating is for electrical insulation. For magnet or transformer applications, the coating needs to be very thin to allow for high density of conductive wires, but still posses high dielectric strengths. The dielectric strength of a particular coating can be measured, for example, by increasing the voltage applied to a wire until failure, such as a burn-through, occurs. For example, a wire having a diameter of about 21 gauge, is preferably thinly coated with an insulating material (about 0.5 mil) that fails above about 3000 volts. One technique for obtaining thin coatings involves dissolving or suspending polymeric materials, especially low molecular weight polymeric materials, including, for example, low molecular weight polyurethanes, polyesters, polyamides or polyesterimides, in an organic solvent, such as xylene, cresylic acid or phenols. The polymeric material is typically dissolved or suspended in the solvent at a concentration of about 25% by weight. The wire is coated by being passed through the polymeric mixture. The coated wire is then passed through a furnace to flash off the solvent. This cycle is necessarily repeated several times, and generally as many as seven times, to obtain a coating having a desirable thickness. It is also difficult to line out the coating operation on the conductive wires using the solvent-based methods. Thus, these processes must generally be operated continuously, since start-up and/or shut-down, for example, over weekends and holidays is difficult. Excessive amounts of energy are expended in this process, as well as the handling of large volumes of toxic chemicals.

Various attempts have been made to reduce the number of cycles associated with the solvent-based methods. For example, polymer/solvent mixtures have been prepared in a concentration of greater than about 25%. The higher concentrations of polymer permits the application of increased amounts of polymer during each pass, thereby reducing the total number of passes. However, the use of higher concentrations of polymer typically results in the application of a less uniform coating. Substantial removal of the solvent from the lower regions of such thick coatings is also extremely difficult; the residual solvent can eventually lead to the introduction of flaws into the coatings. The solvent-based techniques are undesirable also in that the organic solvents involved, for example, phenol and cresylic acids, generally pose numerous health and environmental concerns.

Because magnets, ballasts, and motors get very hot, it is also necessary for the wire coating to have good heat resistance to prevent melting and/or flow of the coatings during use. To obtain desirable heat resistance, it is often necessary to prepare insulating coatings from high molecular weight materials. However, insulating coatings prepared from high molecular weight materials generally possess high viscosities relative to coatings prepared from low molecular weight materials. Accordingly, there is increased difficulty associated with handling such coatings, and they are often applied to wires in the form of thick layers. This results in thick insulating coatings which generally possess undesirably low dielectric strength. In addition, the removal of solvent in the case of solvent-based applications, as noted above, is difficult. The thicker coatings also generally lack desirable flexibility.

Desirable heat resistance has also been provided in the prior art with highly crosslinked polymeric materials. Such highly crosslinked materials tend to be brittle, and typically crack during working of the wire.

Insulating materials can also be applied to a wire as a tape. See, e.g., Anderson et al., U.S. Pat. No. 4,159,920 and Gross et al., U.S. Pat. No. 5,254,806. Such insulating tapes generally possess poor mechanical properties since they are often rigid and tend to crack upon being wound around a mandrel.

Accordingly, new and/or better materials useful as insulation for electrically conducting wires are needed. The present invention is directed to these, as well as other, important ends.

SUMMARY OF THE INVENTION

The present invention is directed generally to methods for making improved, electrically insulated conductive wires including, for example, magnet wires. Specifically, in one embodiment, the present invention relates to a method for electrically insulating a conductive wire. The method comprises coating a conductive wire with an insulating material that comprises a curable acrylate modified aminoamide resin. Preferably, the resin comprises a Michael addition reaction product of an amine terminated polyamide and a polyol ester having a multiplicity of acrylate ester groups.

Another aspect of the invention relates to a method for the preparation of an electrically insulated conductive wire. The method comprises (a) providing a conductive wire; (b) coating the conductive wire with an insulating material which comprises a curable acrylate-modified aminoamide resin; and (c) curing of the coating. Preferably, the resin comprises a Michael addition reaction product of a polyamide and a polyol ester having a multiplicity of acrylate ester groups.

Still another aspect of the invention relates to an electrically insulated conductive wire comprising a conductive wire covered with an insulating material which comprises an acrylate-modified aminoamide resin. Preferably, the resin comprises a Michael addition reaction product of a polyamide and a polyol ester having a multiplicity of acrylate ester groups.

Embodiments of conductive wires of the present invention may be characterized by highly advantageous and unexpected properties. As discussed in more detail below, the present conductive wires are coated with extremely thin coatings of insulating materials. Despite their thinness, the present insulating coatings possess very high dielectric strengths, and few defects. In addition, the present insulating coatings are generally characterized as being highly heat-resistant. Thus, in the context of providing insulation for conductive wires, the present coatings are extremely resistant to melting and/or flow upon exposure to elevated temperatures. The insulating coatings of the present invention are also highly resistant to exposure to wide fluctuations in temperature due to their flexibility. This is an important property since conductive wires used, for example, in electrical equipment, are often subjected to extreme temperature variations caused by a varying flow of electrical current.

Embodiments of conductive wires of the present invention also can be prepared with substantially no coating imperfections, leading to extremely smooth surfaces. The surfaces of the insulating coatings are also preferably substantially tack-free, providing a slippery surface which facilitates working of the wires. Embodiments of the present invention also involve insulating coatings which are extremely hard and which provide good mechanical strength and toughness, while at the same time being highly flexible and workable.

These, as well as possible other advantages, make the present invention a highly desirable coating for use by industry in connection with conductive wires.

Also as discussed in further detail below, the preparation of the conductive wires of the present invention may be accomplished using methods that are also unexpectedly advantageous. Specifically, the methods for preparing the present insulated conductive wires may be conducted in the absence of any noxious or harmful organic solvents. Thus, many of the environmental and health hazards that are typically associated with prior art methods for preparing insulated conductive wires are substantially alleviated with the methods described herein.

These and other aspects and advantages of the invention will become more apparent from the present description and claims.

DETAILED DESCRIPTION OF THE INVENTION

The present invention is directed, in part, to an electrically insulated conductive wire comprising a conductive wire covered with an insulating material. The insulating materials may be applied to wires without the necessity of using organic solvents. Accordingly, conductive wires can be coated with insulating materials according to the methods of the present invention without expending extensive amounts of energy, such energy expenditures being necessary to evaporate the solvent in many prior art, solvent-based coating methods.

Any of a variety of conductive wires may be employed in the methods of the present invention. Suitable conductive wires include, for example, magnet wires. The wire can be formed from a variety of conductive materials including, for example, metals, such as copper and aluminum, electrically conducting ceramics and electrically conducting polymeric materials. The wire can also be shaped as desired, depending, for example, on the contemplated end use application. Thus, the wire can be shaped cylindrically, ribbon-like, rectangularly, and the like. The size of the wires can also be selected, as desired, depending, for example, on the contemplated end use application. Generally speaking, the conductive wires can have a diameter of from about 12 to about 40 gauge, with diameters of from about 18 to about 30 gauge being preferred. More preferably, the conductive wires have a diameter of from about 20 to about 25 gauge.

The insulating material which may be coated onto the conductive wires comprises a curable acrylate-modified aminoamide resin. As used herein, the term "acrylate-modified aminoamide resin" refers generally to polyamide resins which have been chemically modified to include one or more acrylate or methacrylate groups. Without intending to be bound by any theory of operation, it is believed that the acrylate modification and curing improves the heat-resistance of the aminoamide resins without adversely affecting their electrical properties. Substantially any acrylate-modified aminoamide resin may be suitable for use as an insulating material in accordance with the methods of the present invention. Generally speaking, the acrylate-modified aminoamide resins may be obtained by reacting together a polyamide resin containing reactive groups, for example, free amino groups, with a material that contains acrylate and/or methacrylate groups. Suitable acrylate-modified aminoamide resins for use in the methods of the present invention include those described, for example, in Frihart, U.S. Pat. No. 4,975,498; Frihart et al., U.S. Pat. No. 4,987,160; and Frihart, U.S. Pat. No. 5,155,177, the disclosures of each of which are incorporated by reference herein, in their entirety.

In preferred embodiments of the present invention, the acrylate-modified aminoamide resin comprises the Michael addition reaction product of a thermoplastic polyamide with a polyol ester having a multiplicity of acrylate ester groups. As used herein, the term "multiplicity" refers to two or more acrylate ester groups, and may include three or more, four or more, five or more, six or more, seven or more, eight or more, nine or more or ten or more acrylate ester groups. As discussed more fully hereinafter, the resin can be cured by exposure to heat, light and/or electron beam, or by other methods known to those skilled in the art.

Broadly speaking, the acrylate-modified aminoamide resins may be prepared from substantially any thermoplastic aminoamide polymer. Preferably, the acrylate-modified aminoamide resin is prepared by reacting together a polyamide resin that contains one or more reactive amino groups and a monomeric acrylate material containing at least two acrylate groups. As used herein, the term "reactive amino group" refers to a primary or secondary amino group. The polyamide and acrylate-containing materials are reacted in a ratio such that the reaction product (the acrylate-modified aminoamide) has at least one free, or unreacted, acrylate groups, and may have, for example, two or more, three or more, four or more, five or more, six or more, seven or more, eight or more, nine or more or ten or more unreacted acrylate groups.

In preferred embodiments of the present invention, the polyamide resin from which the acrylate-modified aminoamide resin is prepared is derived from a polymerized unsaturated fatty acid, including, for example, the material known commercially as "dimer acid". In certain preferred embodiments, the polyamides have an amine number of from 1 to about 100, with amine numbers of from about 3 to about 40 being more preferred. In certain other preferred embodiments, the polyamides have an amine number of from 1 to about 50, with amine numbers of from about 2 to about 20 being more preferred. In yet certain other preferred embodiments, the polyamides have an amine plus acid number of from about 1 to about 50, with amine plus acid numbers of from about 2 to about 30 being more preferred, and amine plus acid numbers of from about 2 to about 20 being even more preferred. The acid and amine numbers are expressed in a conventional manner in terms of milligrams of equivalent KOH per gram of sample. In certain preferred embodiments, the number of amine groups of the polyamide resin is from about 51 to about 99% of the total number of acid and amine groups. With very low functionality, the acrylate groups may in some instances be too disperse to provide desirable curing. With higher functionality, there may in certain circumstances be a risk of premature gelation or excessive viscosity. Generally speaking, the preferred polyamides are those having a softening point above about 50° C., with softening points from about 75° C. to about 200° C. being more preferred. The even more preferred polyamides are those having a softening point from about 95° C. to about 150° C.

In certain preferred aspects of the invention, the polyamides are derived from polymerized fatty acids, linear, branched or cyclic dicarboxylic acids, and linear, branched or cyclic polyamines. The molecular weight of the polyamide can be controlled via the addition of a linear monocarboxylic acid and/or by changing the ratio of amines and acids.

Preferably, the polyamides are derived from dimer acid that is cocondensed with other dibasic acids. The term "dimer acid" is commonly used in the resin field and refers generally to polymeric or oligomeric fatty acids which are derived from the addition polymerization of unsaturated tall oil fatty acids. These polymeric fatty acids typically have a composition, for example, of about 0 to about 10% $C_{18}$ monobasic acids, from about 60 to about 95% $C_{36}$ dibasic acids, and from about 1 to about 35% $C_{54}$ tribasic and higher polymeric acids. The relative ratios of monomer, dimer, trimer and higher polymer in unfractionated "dimer acid" depends, for example, on the nature of the starting material and the conditions of polymerization and distillation. Methods for the polymerization of unsaturated fatty acids are described, for example, in U.S. Pat. No. 3,157,681, the disclosures of which are hereby incorporated by reference herein, in their entirety. The use of reduced (hydrogenated) dimer acids generally improves the color and oxidative stability of the polyamides, and is intended to be within the scope of the present invention, as is the use of distilled fractions, such as the dimer fraction of dimer acid. Examples of dimer acids which are particularly useful in the preparation of the coating materials of the present invention are UNIDYME™ 14 and UNIDYME™ 18, each of which is commercially available from Union Camp Corporation, of Wayne, N.J. UNIDYME™ 14 comprises about 0.4 wt % monomer, about 95.6 wt % dimer and about 4.0 wt % trimer (and higher polymer). UNIDYME™ 18 comprises about 1.5 wt % monomer, about 82.0 wt % dimer, and about 17.0 wt % trimer.

As noted above, the dimer acid may be cocondensed with other dibasic acid. The other dibasic acid with which the dimer acid is cocondensed preferably contains from about 2 to about 30 carbons, with other dibasic acids of from about 6 to about 21 carbons being preferred. Suitable dibasic acids include dibasic aliphatic acids. Exemplary of these acids are oxalic, malonic, succinic, suberic, adipic, azelaic, sebacic, dodecanedioic and eicosanedioic acids. The dibasic acid can also be an aromatic acid, such as isophthalic acid or terephthalic acid or their esters. A cyclic dibasic acid, such as cyclohexane dicarboxylic acid, can be a particularly suitable dibasic acid for cocondensing with the dimer acid. WESTVACO 1550™, which is a non-linear dibasic acid of 21 carbons commercially available from Westvaco Corp. of New York, N.Y., can be a particularly suitable dibasic acid for cocondensing with or as a replacement for the dimer acid.

The relative amounts of the dimer acid and other dicarboxylic acid employed in the preparation of the polyamides can vary, as those skilled in the art would recognize. In certain preferred embodiments, the polyamides are made using about 30 to about 100 equivalent % of a dimer acid or the reaction product of an acrylic acid with an unsaturated fatty acid, such as, WESTVACO 1550™. This means that, for example, from about 30 to about 100% of the total acid groups present prior to polymerization are derived from the dimer component. More preferably, the polyamides are made using from about 50 to about 100 equivalent % of the fatty acid, with a fatty acid content of from about 70 to about 100 equivalent % being even more preferred.

As noted above, the amount of the other dicarboxylic acid employed in the preparation of the polyamides can vary. Preferably, the polyamides are prepared using up to about 70 equivalent % of the other dibasic acid, with from about 0 to about 50 equivalent % of the other dibasic acid being more preferred. Even more preferably, the polyamides are prepared using from about 0 to about 30 equivalent % of the other dibasic acid.

As noted above, a monocarboxylic acid can be employed, if desired, in the preparation of the polyamide to control the molecular weight. Preferred monocarboxylic acids are linear and have from about 2 to about 22 carbons with monocarboxylic acids having from about 16 to about 18 carbons being more preferred. Exemplary monocarboxylic acids include, for example, acetic acid, propionic acid, myristic acid, palmitic acid, stearic acid, tall oil fatty acids and oleic acid. When used, the monocarboxylic acid is desirably incorporated in amounts of up to about 15 equivalent %, with amounts of from greater than about 0 to about 8 equivalent % being more preferred.

With respect to the amine component, the polyamide is preferably derived from a linear, branched or cyclic aliphatic amine of from about 2 to about 60 carbons. Preferably, the polyamide is derived from an aliphatic diamine having from about 2 to about 6 carbons, cyclic diamines or aromatic diamines. Exemplary of suitable amines include, for example, ethylenediamine, 1,3-diaminopropane, 1,2-diaminopropane, 1,4-diaminobutane, 1,5-diaminopentane, hexamethylenediamine, 2-methyl-1,5-pentanediamine, methylnonanediamine, toluenediamine, methylenedianiline, xylenediamine, bis(aminomethyl)benzene, isophoronediamine, diaminocyclohexane, bis(aminomethyl) cyclohexane, bis(4-aminocyclohexyl)methane, bis(4-amino-3-methylcyclohexyl)methane, piperazine, dimer diamine (diamine made from dimer acid), and polyetherdiamines (diamines made from ethyleneoxide or propyleneoxide), such as the JEFFAMINES™ (Huntsman Corporation of Houston, Tex.). Higher polyamines can be included, if desired. However, the higher polyamines are preferably included in small amounts to avoid premature gelation. Examples of such higher polyamines include diethylenetriamine, triethylenetetramine, tetraethylenepentamine and bishexamethylenetriamine. Other suitable diamines, in addition to those exemplified above, would be readily apparent to one skilled in the art based on the present disclosure.

The relative amount of the amine can vary, as those skilled in the art would recognize. In preferred embodiments, the polyamides are made using from about 101 to about 120 equivalent % of amine, based upon the total acids being about 100 equivalent %, with from about 103 to about 115 equivalent % being more preferred. Even more preferably, the polyamides are made using from about 104 to about 110 equivalent %.

Polyamides which are particularly suitable for use in the preparation of acrylate-modified aminoamide resins and which are commercially available include, for example, UNI-REZ® 2622, 2642, and 2949 (Union Camp Corp., Wayne N.J.). Other suitable polyamides, and their preparation from dimerized fatty acids, generally, is described, for example, in Peerman, et al., U.S. Pat. No. 3,377,303, the disclosures of which are hereby incorporated herein by reference, in their entirety.

As noted above, polyol (meth)acrylic acid esters are particularly suitable for reacting with polyamides in connection with the preparation of the acrylate-modified aminoamide. The polyol esters are preferably esters of acrylic or methacrylic acid, or a mixture thereof, having a multiplicity (about two or more) of acrylate and/or methacrylate ester groups. It should be understood that, in the context of the present invention, methacrylate is intended to be included in the general term "acrylate", and methacrylic is intended to be included in the general term "acrylic acid". In preferred form, the polyol esters involved in the preparation of the acrylate-modified aminoamides comprise from about 2 to about 8 acrylic or methacrylic acid groups. It is preferred also that the polyol has a minimum of two alcoholic hydroxy groups prior to esterification. It is not necessary that all of the alcoholic groups be esterified with acrylic acid, provided that, on average, at least two or more hydroxy groups are so esterified.

A wide variety of polyol esters are available for use in the preparation of acrylate-modified aminoamide resins. Exemplary polyol esters include, for example, ethylene glycol diacrylate, ethylene glycol dimethacrylate, butanediol diacrylate, butanediol dimethacrylate, diethylene glycol diacrylate, diethylene glycol dimethacrylate, glycerol trimethacrylate, sorbitol triacrylate, trimethylolethane triacrylate, trimethylolpropane triacrylate, ethoxylated trimethylolpropane triacrylate, trimethylolpropane trimethacrylate, pentaerythritol triacrylate, pentaerythritol tetraacrylate, pentaerythritol trimethacrylate, pentaerythritol tetramethacrylate, multifunctional acrylates or methacrylates of dipentaerythritol or tripentaerythritol, sucrose pentamethacrylate, bisphenol-A bis(hydroxypropyl) ether diacrylate, and the like. Preferred among the foregoing polyol esters are trimethylolethane triacrylate, trimethylolpropane triacrylate, ethoxylated trimethylolpropane triacrylate, trimethylolpropane trimethacrylate, pentaerythritol tri- or tetraacrylate and pentaerythritol tri- or tetramethacrylate.

In certain preferred embodiments of the present invention, the preparation of the acrylate-modified aminoamide resin involves also a reactive diluent. Thus, in preferred form, the acrylate-modified aminoamide resin is prepared by reacting together a polyamide, a polyol (meth)acrylic ester, and a reactive diluent. Preferably, the reactive diluent comprises a mono- or disubstituted amine having about 10 to about 44 carbons, with about 18 to about 44 carbons being more preferred. The diluent preferably has a low volatility and may contain, in addition to an amino group, other functional groups. Preferred reactive diluents include, for example, stearylamine, tallowamine, distearylamine, ditallowamine and dihydrogenated tallowamine. Diamino reactive diluents, such as tallowaminopropylamine and dimer diamine, can also be used. Generally speaking, low volatility amines are preferred over higher volatile amines. When the reactive diluent is employed in the Michael addition reaction, the ratio of polyamide to reactive diluent is preferably from about 1000:1 to about 100:25, with ratios of about 100:1 to about 100:10 being preferred.

The acrylate-modified aminoamide resins involved in the methods of the present invention preferably comprises the product of a Michael addition reaction. The term "Michael addition reaction", as used herein, refers to the addition reaction of an amino group across a double bond which is activated, such as, for example, a double bond that is conjugated with a carbonyl group, such as a carbonyl group of an ester moiety, to form a more highly alkylated amine. An exemplary Michael addition reaction is depicted schematically below.

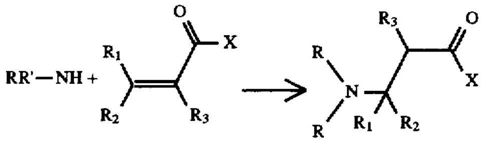

where each of R, R', $R_1$, $R_2$ and $R_3$ is, for example, hydrogen or alkyl, and X is, for example, alkoxy. In the context of the present invention, at least one of R and R' above is a monovalent non-carbonyl carbon radical which corresponds to the carbon terminus of the aminoamide polymer chain. R and R' may also be aminodiethylene as, for example, when piperazine is used.

The reactions for preparing the acrylate-modified aminoamide resins described herein, including the Michael addition reactions, are generally exothermic. Accordingly, the reactions are typically substantially complete upon the cessation of the evolution of heat. Other means for determining the end-point of the reactions include, for example, attainment of a constant viscosity. In addition, the progress of the reactions can be monitored with any of a variety of analytical methods for double bond assay, including, for example, nuclear magnetic resonance (nmr) or infrared spectroscopy (ir). For example, the ratio of olefinic protons adjacent to the ester group to saturated aliphatic protons can be measured by nmr. In the case of Michael addition reactions, this ratio will generally level out as the reaction nears completion. With respect to ir, the bands characteristic of double bonds adjacent to the ester group will disappear as the reaction nears completion. It is also possible to note the substantial completion of the reaction by the disappearance of the characteristic odor of acrylate monomer and/or a separate gas phase. It will be apparent to one skilled in the art, based on the present disclosure, that once the reaction conditions to obtain completion or substantial completion of the desired reaction are determined, for example, by the analytical means described above, additional batches of Michael addition reaction product can be made from the same or similar reactants by employing the same or similar reaction conditions.

In preferred aspects of the invention, the ratio of the polyamide to the acrylate is selected such that the ratio of the initial acrylated polyol ester molecules to the initial amino groups of the aminoamide polymer and of the diluent is greater than one. In this manner, each of the amino groups reacts on average with an acrylate molecule, thereby leaving additional acrylate groups unreacted. Assuring this ratio to the first approximation is a matter of simple mathematics based on the amino functionality of the polyamide resin, the amino functionality of the diluent, and the molecular weight of the polyol acrylate, all of which are known quantities. For example, if a diacrylate is used, the moles of diacrylate should be about 1.0 per molar equivalent of amino functional groups in the polyamide resin. In this manner, the acrylate-modified aminoamide resin will contain unreacted acrylate groups which can react in a subsequent curing step. The calculated amount of acrylate also needs to reflect the amount of amine containing diluent that is added to the polyamide.

The polyamides employed in the present invention generally lack extensive functionality. Accordingly, gelation is rarely encountered. However, if gelation is encountered during the preparation of the acrylate-modified aminoamide resins, a reduction in the amount or the amine number of the polyamide, or in the polyfunctionality of the acrylate, can overcome this problem. Gelation can be reduced by increasing the amount of diluent or by using an excess of the acrylates.

A preferred ratio of acrylate molecules to amino groups in the reactions described herein is from about 1:1 to about 8.0:1, with a ratio of about 1:1 to about 2:1 being more preferred, and a ratio of about 1:1 to about 1.2:1 being even more preferred. This assures that each amino group reacts on average with an acrylate molecule, leaving additional acrylate groups unreacted in sufficient numbers to enable the subsequent curing step to be carried out as desired.

A variety of techniques are available for carrying out the reactions, including the Michael addition reaction, which are involved in the preparation of the acrylate-modified aminoamide resins described herein. Preferably, the reaction entails bringing the involved reactants together in a common phase. This can be accomplished by the use of a solvent, for example, ethanol, 2-propanol or ethylene dichloride. However, it is advantageous to avoid the use of solvents, with the attendant recovery problems, by melting the polyamide and diluent, and then admixing the melted polyamide with the acrylate ester, which is generally a liquid at room temperature or a solid having a low melting point. In this case, the present invention provides methods for preparing the acrylate-modified aminoamide resin and the electrically insulated conductive wires which are both substantially solvent-free. Since at least one of the reactants is generally a solid, the reaction mixture is preferably heated to at least the softening point of the lowest melting reactant. Preferably, the reaction temperature does not exceed 190° C., since some premature polymerization of the reaction product can occur at higher temperatures.

The reaction can be conducted in any suitable vessel preferably having resin mixing capabilities. Accordingly, suitable vessels include, for example, a kettle with a stirrer, a Branbury mixer, an extruder or even a static mixer. The process can be performed either as a continuous or batch modification process.

Generally, purification of the acrylate-modified aminoamide resin is unnecessary. As discussed below, a temporary inhibitor, such as hydroquinone, can be added, if desired, to the reaction mixture to inhibit undesired thermal polymerization during the reaction. If such an inhibitor is used, it can be extracted from the reaction mixture after completion of the reaction, with a solvent, such as acetone or aqueous alkali. However, it is preferred to avoid processing of the reaction product with solvents in view of the recovery and environmental concerns. Leaving the inhibitor in can also improve the storage stability of the acrylate-modified polyamide.

The acrylate-modified aminoamide resin is generally a solid material at room temperature, and typically possesses a light yellow to light brown color. The acrylate-modified aminoamide resin can be conveniently pelletized, granulated or powdered prior to packaging. The product can also be supplied in tubes and drums for certain application equipment.

As indicated above, certain of the advantages of the coating materials of the present invention are due to the relatively low molecular weight of the acrylate-modified aminoamide resins from which they are prepared. Generally speaking, the acrylate-modified aminoamide resins, and especially the Michael addition reaction products, have a weight average molecular weight of about 30,000 or less. Preferably, the acrylate-modified aminoamide resin has a weight average molecular weight of about 20,000 or less, with a weight average molecular weight of about 15,000 or less being more preferred. Even more preferably, the acrylate-modified aminoamide resin has a weight average molecular weight of about 10,000 or less.

The acrylate-modified aminoamide resin further optionally includes a source of free radicals, also known as a thermally activated initiator. Preferably, the initiator is a catalyst which is stable under the conditions that the reaction product is stored. Exemplary of suitable catalysts are those which have a half-life of about 10 hours at above about 50° C. Such catalysts include, for example, t-butyl peroxypivalate, lauroyl peroxide, benzoyl peroxide, t-butyl peroctoate, t-butyl peroxy isopropyl carbonate, t-butyl perbenzoate, di-t-butyl peroxide and t-butyl hydroperoxide, azobisisobutyronitrile, cumyl peroxide, dicumyl peroxide, t-butyl cumyl peroxide, bis(t-butylperoxy)-diisopropylbenzene and ethyl O-benzoyllaurohydroximate. Preferred among these initiators is dicumyl peroxide, which has a good storage lifetime and a good curing effectiveness.

The thermal initiators can be added before, during or, preferably, after, the reaction for preparing the acrylate-modified aminoamide resin. This is to avoid premature activation when the reaction mixture is warmed with external heating or by the exotherm of the reaction. The concentration of the initiator can vary, and depends upon a variety of factors, including, for example, the type of initiator and the reactivities of the reactants. Generally, the concentration of initiator can be, for example, from about 0.01 to about 5%, with concentrations of from about 0.02 to about 2% being preferred. The latter concentration range provides an adequate balance between shelf life and cure rate at the desired curing temperatures. With the initiators in the lower temperature range of activity, the product containing them should either be used quickly or stored at low temperature, for example, at refrigerator conditions. With initiators in the higher temperature range, for example, initiators having a half-life of about 10 hours at greater than about 70° C., the reaction product generally has a desirable shelf-life at ambient temperature.

With heat-activated curing initiators, the curing temperature can be, for example, from about 70° C. to about 250° C., and the curing times can be, for example, from less than a minute at higher temperatures to about a week at lower temperatures. As known to one of ordinary skill in the art, the selection of the initiator can influence the requisite cure temperatures and times. If the cure is permitted to take about 10 hours, a suitable temperature range is at about the temperature at which the initiator has a 10 hour half-life. Shorter cure times generally require higher temperatures.

Optionally, a photoinitiator is included if the acrylate-modified aminoamide resin is to be cured by light. The photoinitiator can generally be omitted for a product to be cured, for example, by exposure to electron beam, gamma radiation or X-ray. Of course, the presence of the photoinitiator permits curing by any of these means.

Exemplary photoinitiators include, for example, benzoin ethers, dialkoxyacetophenones, α-hydroxycyclohexyl aryl ketones, α-ketophenylacetate esters, benzyldialkylketals, chloro- or alkylthioxanthones, α-amino- or α-hydroxyalkyl aryl ketones, and the like. An example of a suitable photoinitiator for use in the methods of the present invention is IRGACURE™ 907 (2-methyl-1-4-(methylthio)phenyl-2-morpholinopropanone-1), commercially available from Ciba-Geigy Corp of Ardsley, N.Y. Other initiators include IRGACURE™ 500 (a mixture of benzophenone and 1-hydroxycyclohexyl phenyl ketone), IRGACURE™ 651 (α,α-dimethoxy-α-phenylacetone), and IRGACURE™ 369 (2-benzyl-2-(dimethylamino)-1-{4-(4-morphinolinyl) phenyl}-1-butanone. Generally, the use of amine synergists is unnecessary with a photoinitiator that is typically used with such synergists, such as benzophenone or thioxanthone, since the resin itself provides amino groups.

Visible light photoinitiators can also be used in the curing process. These materials are used much the same way as the UV initiators, except that the light used for the reaction is in the visible range of 400 to 800 nm. Among the photoinitiators that can be used is camphorquinone.

The photoinitiator can be incorporated before, during or after the reaction involved in the preparation of the acrylate-modified aminoamide resin. The photoinitiators can be added at 0.1 to 8 wt % of the product. The preferred amount of photoinitiator is 0.5 to 5 wt %, with 1 to 3 wt % being even more preferred.

As noted above, a stabilizer, such as a phenolic inhibitor of free radical polymerization, can be incorporated with the acrylate-modified resin. Such stabilizers can be helpful in prolonging the shelf life of the product. Exemplary phenolic inhibitors include, for example, hydroquinone, methoxyphenol, benzoquinone, phenothiazine and the like. Suitable stabilizers are often already present in the polyol acrylates used as reactants. Generally, the stabilizer can be incorporated in the acrylate-modified aminoamide resin at levels from about 5 ppm to about 5,000 ppm.

It will be apparent to one skilled in the art, based on the present disclosure, that other additives can be optionally combined with the acrylate-modified aminoamides. Exemplary additives include, for example, fillers, reinforcing agents, coupling agents, pigments, colorants, dyes, odorants, other comonomers, resins, tackifiers, plasticizers, lubricants, stabilizers, antistatic agents, and the like. Pigments, colorants and/or dyes are especially desirable in that they permit visualization of the thin coating of insulating material after application and curing of the acrylate-modified aminoamide resin. Of course, as would be apparent to one of ordinary skill in the art, the pigment, colorant and/or dye preferably does not absorb radiation in the same region as that of any photoinitiator which may be included in the acrylate-modified resin. If desired, agents can also be incorporated in the acrylate-modified resins which serve to improve adhesion of the insulating coatings to the wires.

It is also optional to add additional amounts of a polyol acrylate, for example, to increase the crosslink density and/or provide a more firmly cured product. Conversely, additional monoacrylate or thermoplastic resin can be included to achieve, for example, a harder, but still pliable product.

In accordance with the present invention, there is provided an electrically insulated conductive wire. In preferred form, the insulated wire comprises a conductive wire or core that is covered with an acrylate-modified aminoamide resin of the type described in detail above. A variety of methods are available for applying and curing the acrylate-modified aminoamide resin onto the conductive wire. Such methods would be apparent to the skilled artisan based on the present disclosure. Exemplary methods are disclosed, for example, in Linderoth et al., U.S. Pat. No. 4,234,624; Völker et al., U.S. Pat. No. 4,342,794; and Zaopo, U.S. Pat. No. 4,726,993, the disclosures of which are hereby incorporated by reference herein, in their entirety.

Generally speaking, the application of the insulating material involves coating a conductive wire with the acrylate-modified aminoamide resin. This can be achieved with any suitable coating technique and/or coating apparatus. Preferably, the resin is coated in a substantially even layer on the conductive wire. In addition, and as noted above, the present conductive wires are desirably and advantageously coated with extremely thin coatings of insulating materials. "Thin", as used herein, refers to insulating coatings on conductive wires that have a thickness of no greater than about 20% of the bare wire diameter. The thickness of the resin that is coated on the wire can vary and depends, for example, on the diameter or gauge of the wire being coated, the particular resin employed, the contemplated end use application, and the like. Generally speaking, a larger diameter wire requires a greater thickness of resin, and a smaller diameter wire requires a lessened thickness of resin. It is preferred that the resin be applied in as thin a layer as possible, without sacrificing important properties, such as electrical resistance, heat resistance, mechanical strength, toughness, and the like. The thickness in which the coating is desirably applied to the wire is conveniently expressed in terms of thickness (%) of coating per diameter of the bare (uncoated) wire. As noted above, the resin is desirably coated on the wire in a thickness of no greater than about 20% of the bare wire diameter. In preferred form, the resin is coated on the conductive wire in a thickness of about 0.5 to about 15% of the bare wire diameter, with a thickness of about 1 to about 12% of the bare wire diameter being more preferred. Even more preferably, the resin is coated on the conductive wire in a thickness of about 1.5 to about 8% of the bare wire diameter.

As noted above, an advantage of the present invention is that the insulating materials can be applied without the necessity of dissolving or suspending the acrylate-modified aminoamide resins in a solvent. Thus, the acrylate-modified aminoamide resins can be applied onto the wire neat (solvent-free).

An advantageous aspect of the present invention is that the acrylate-modified resins are thermosets which desirably set-up (harden) substantially immediately after being coated on the wire. This quick set-up is desirable in that reduced operational difficulties are encountered with the coated wires prior to curing. In addition, the hardened coating minimizes the possibility of introducing defects into the coating caused, for example, during handling operations.

After the resin is coated on the wire, the resin is cured. The curing is controlled with the coatings of the present invention so that the thermoplastic becomes a thermoset, but not to the point of being unflexible. This cured thermoset does not melt under heat, but is not brittle and can stretch more than 100% in tensile elongation. This enables the curing to desirably enhance certain of the physical properties of the coatings, for example, mechanical strength, without undesirably diminishing certain of the other physical properties, such as flexibility. Reduced flexibility is typically observed in connection with coatings of the prior art that undergo extensive crosslinking.

As noted above, curing can be achieved via any of a number of ways, including thermal curing, photocuring and curing by exposure to electron beam radiation. Thermal curing, as used herein, also includes curing by dielectric heating. In the case of thermal curing, the coated wire is heated, for example, to a temperature of about 70° C. to about 250° C. for a period of, for example, about one minute at the higher temperatures to about one week at the lower temperatures.

Photocuring can involve exposure of the coated wires to any of a variety of wavelengths of radiation including, for example, ultraviolet (UV) radiation. Generally speaking, the acrylate-modified resin is cured upon exposure to radiation at a wavelength of, for example, from about 200 to about 600 nm, with wavelengths of from about 250 to about 450 nm being preferred. Even more preferably, the acrylate-modified resin is cured by exposure to radiation of from about 300 to about 400 nm. The coated wire is exposed to radiation for a period of time effective to promote curing. For visible curing, the radiation can be in the range of 400 to 800 nm. Generally speaking, curing is effective upon exposure to radiation for a period of time of from about fractions of a second to about several seconds. In addition to thermal curing and photocuring, the resins can be cured upon exposure to electron beam radiation. It is contemplated, however, that photocuring is preferred.

The resin can be applied to the wire as a single coating, or as two or more coatings, as desired. In the case of multiple applications of resin coatings, each coating can be cured prior to the application of the subsequent coating. Alternatively, the multiple coatings can all be applied, after which the multiple coatings are cured.

After coating and curing, an insulated conductive wire is obtained. These coated wires were evaluated by the standard NEMA tests, as described in Publication MW-1000. The insulating coatings of the present invention possess highly desirable properties, including desirable heat resistance, mechanical properties and dielectric strength. The coated wires have high flexibility which, in the case of, for example, magnet wires, permits the wires to be wound readily onto bobbins. The insulated wires prepared according to the methods described herein also possess extremely smooth and tack-free surfaces, which enable the wires to be wound uniformly without cross-over. Also in the case of magnet wires, the wires are substantially resistant to failure upon application of a voltage of at least about 2000 volts, preferably about 2800 volts or more, more preferably about 3000 volts or more, and even more preferably, about 4000 volts or more, as described in Section 3.7 of MW-1000. Moreover, the insulating coating is substantially heat-resistant. "Heat-resistance", as used herein, refers to the ability of the insulating coatings to be substantially resistant to melting and/or flow upon exposure to elevated temperature. Preferably, the insulating coatings do not substantially melt and/or flow upon exposure to temperatures of at least about 105° C., with melt/flow resistance to temperatures of at least about 120° C. being preferred, and melt/flow resistance to temperatures of at least about 150° C. being even more preferred. The insulated wires desirably possess a minimum number of imperfections as measured, for example, by the number of faults per 100 feet of wire. Preferably, the insulated wires are obtained with from about 0 faults per 100 feet to about 25 faults per 100 feet, with from about 0 to about 10 faults per 100 feet being more preferred. Most preferably, there are no faults per 100 feet of wire, as described in Section 3.8 of MW-1000. The coated wire also meets other performance properties, such as cut-through, spingback, bend, and elongation.

The present insulated wires can be used in a variety of applications which involve the use of conductive wires, including electrically insulated conductive wires. For example, the insulated conductive wires described herein can be used as an integral part of electrical equipment, such as transformers, motors, ballasts and the like. Other uses would be readily apparent to one skilled in the art, based on the present disclosure.

The invention is further described in the following examples. The examples are for illustrative purposes only, and are not to be construed as limiting the appended claims.

EXAMPLES

The following examples describes the preparation of the precursor to the acrylate-modified aminoamide polymers.

Example 1

Polyamides were produced by combining all the reactive ingredients except the amines) in a flask, and heating the ingredients to 90° C. Then the amines were added, and the ingredients were heated to 225°–250° C. under nitrogen. A nitrogen inlet, baret trap, condenser and thermocouple were attached to the resin kettle head. This temperature was maintained with stirring over a two hour period under nitrogen. The baret trap and condenser were removed and a vacuum (25 to 30 inches Hg) was applied for an additional two hours, with heating. The resins were then poured out and allowed to cool.

Resin (a): The components used were polymeric fatty acid (UNIDYME™ 14; Union Camp Corporation, Wayne, N.J.) (100 equiv. %), and ethylenediamine (105.5 equiv. %). In some cases, stabilizers and catalyst were added. The product resin had a viscosity of 7,340 centipoise (cps) at 190° C., as measured by a Brookfield RVTD viscometer, a Mettler softening point of 117° C., an acid number of 0.8 and an amine number of 8.7.

Upon solidification, the mixture (27 g) was placed in a Carver laboratory press apparatus. The solidified mixture was pressed at a temperature and pressure sufficient to form a sheet of uniform thickness. The pressed sheet was then stamped using a mallet and die to obtain samples for tensile tests.

Tensile samples were tested at 23° C., after at least 24 hour storage at 23° C. and 50% humidity. The tensile tests were conducted according to standard ASTM method D-638.

The results of the tensile tests and viscosity measurements for the uncured polyamide resin are set forth in Table 1.

Resin (b): The same procedure was followed as for Resin (a) except that the components were polymeric fatty acid (UNIDYME™ 18) (96.9 equiv. %), linear monocarboxylic acid (3.1 equiv. %) and ethylenediamine (105.5 equiv. %). The product had a viscosity of 6,000 centipoise at 190° C., a Mettler softening point of 109° C., an acid number of 0.9 and an amine number of 10.1.

Example 2

The same procedure was followed as for Example 1 except that the components were polymeric fatty acid (UNIDYME™ 14) (93.9 eq. %), sebacic acid (6.0 eq. %), ethylenediamine (90.5 eq. %), 1,2-diaminopropane (15.0 eq. %), IRGANOX 1010 (0.5 wt. %, based on the weight of the polyamide), Vanox 1081 (1.0 wt %), microcrystalline wax (0.5 wt %) and about 6 drops of phosphoric acid.

The resulting polyamide had an acid number of 1.6 and an amine number of 10.9. The viscosity was 7,100 cps at 190° C., as measured by a Brookfield RVTD viscometer, and the polyamide had a softening point of 155° C., as determined by Mettler softening point method.

Example 3

The same procedure was followed as for Example 1 except that the components were polymeric fatty acid (UNIDYME™ 14) (94.0 equiv. %), dodecanedioic diacid (6.0 equiv. %), and ethylenediamine (105.5 equiv. %). The polyamide had an acid number of 0.6 and an amine number of 9.9. The viscosity of the polyamide at 190° C., as measured by a Brookfield RVTD viscometer, was 5,800 cps, while the softening point, as determined by Mettler softening point methods, was 133° C.

Example 4

The same procedure was followed as for Example 1 except that the components were polymeric fatty acid (UNIDYME™ 14) (100.0 equiv. %), ethylenediamine (102.7 equiv. %) and diethylenetriamine (3.0 equiv. %). The polyamide had an acid number of 0.9 and an amine number of 13.9. The viscosity of the polyamide at 190° C., as measured by a Brookfield RVTD viscometer, was 3,850 cps, while the softening point, as determined by Mettler softening point methods, was 107° C.

Example 5

The same procedure was followed as for Example 1 except that the components were polymeric fatty acid (UNIDYME™ 14) (87.9 equiv. %), sebacic acid (12.1 equiv. %), ethylenediamine (89.0 equiv. %), and hexamethylenediamine (16.4 equiv. %). The polyamide had an acid number of 0.8 and an amine number of 8.5. The viscosity of the polyamide at 190° C., as measured by a Brookfield RVTD viscometer, was 10,740 cps, while the softening point, as determined by Mettler softening point methods, was 139° C.

The following examples describe the preparation of uncured acrylate-modified aminoamide resin.

Example 6

The aminoamide resin of Example 1 (a) (200 g) was heated in a reactor to 190° C. to liquefy the resin, and a vacuum was applied to dry the resin. Then ADOGEN™ 240 (dihydrogenated tallowamine, from Witco Corporation, Dublin, Ohio) (20.0 g), IRGACURE™ 500 (Irgacure 500 is a photoinitiator made by Ciba-Geigy Corp. and is a mixture of benzophenone and 1-hydroxycyclohexyl phenyl ketone) (2.3 g) and hydroquinone (0.4 g) were combined, and the reaction mixture was cooled to 160° C. The agitation was increased and trimethylolpropane triacrylate (15.0 g) was added. After stirring the reaction mixture for 15 minutes, the Michael addition reaction was deemed complete by formulation of a single phase and by low acrylate odor. The reaction product was discharged from the reactor and cooled. The reaction product had a viscosity of 3,400 cps at 190° C. and a Mettler softening point of 114° C.

Example 7

The aminoamide resin of Example 1 (b) was modified by the procedure in Example 6, except that the components were Example 1(b) (210 g), ADOGEN™ 240 (21.0 g), IRGACURE™ 500 (7.6 g), hydroquinone (0.4 g), and trimethylolpropane triacrylate (23.2 g). The reaction product had a viscosity of 8200 cps at 190° C. and a Mettler softening point of 110° C.

Example 8

The aminoamide resin of Example 1 (a) was modified by the procedure in Example 6, except that the components were Example 1(a) (400 g), ADOGEN™ 240 (20.0 g), IRGACURE™ 500 (4.5 g), hydroquinone (0.8 g), and trimethylolpropane triacrylate (31.9 g). The reaction product had a viscosity of 4,090 cps at 190° C. and a Mettler softening point of 110° C.

Example 9

The aminoamide resin of Example 1 (a) was modified by the procedure in Example 6, except that the components were Example 1(a) (200 g), ADOGEN™ 240 (4.0 g), IRGACURE™ 907 (Irgacure 907 is a photoinitiator made by Ciba-Geigy Corp. and has the chemical name 2-methyl-1-4-(methylthio)phenyl-2-morpholino-propanone-1) (2.2 g), hydroquinone (0.4 g), and trimethylolpropane triacrylate (12.5 g). The reaction product had a viscosity of 4,980 cps.

Example 10

The aminoamide resin of Example 1 (a) was modified by the procedure in Example 6, except that the components were Example 1 (a) (200 g), ADOGEN™ 240 (2.0 g), IRGACURE™ 907 (2.2 g), hydroquinone (0.4 g), and trimethylolpropane triacrylate (12.5 g). The reaction product had a viscosity of 7,200 cps at 190° C.

Example 11

The aminoamide resin of Example 2 was modified by the procedure in Example 6, except that the components were Example 2 (200 g), ADOGEN™ 240 (20.0 g), IRGACURE™ 500 (2.4 g), hydroquinone (0.4 g), and trimethylolpropane triacrylate (21.9 g). The reaction product had a viscosity of 6,300 cps at 190° C.

Example 12

The aminoamide resin of Example 3 was modified by the procedure in Example 6, except that the components were Example 3 (200 g), ADOGEN™ 240 (20.0 g), IRGACURE™ 500 (2.2 g), hydroquinone (0.4 g), and trimethylolpropane triacrylate (22.1 g). The reaction product had a viscosity of 6,600 cps at 190° C.

Example 13

The aminoamide resin of Example 4 was modified by the procedure in Example 6, except that the components were Example 4 (300 g), ADOGEN™ 240 (15.0 g), IRGACURE™ 500 (3.5 g), hydroquinone (0.6 g), and trimethylolpropane triacrylate (33.8 g). The reaction product had a viscosity of 22,300 cps at 190° C.

Example 14

The aminoamide resin of Example 5 was modified by the procedure in Example 6, except that the components were Example 5 (200 g), ADOGEN™ 240 (20.0 g), IRGACURE™ 500 (2.4 g), hydroquinone (0.4 g), and trimethylolpropane triacrylate (20.6 g). The reaction product had a viscosity of 16,920 cps at 190° C.

The following examples are directed to curing acrylate-modified aminoamide resins, including various of the resins described in the foregoing examples.

Example 15

A thin film (60 mil) of the resin prepared in Example 6 was cured at a distance of ten inches under a Dymax Light-Welder PC-2 with a UV-B filter for six minutes. After this UV exposure, the film did not melt when heated to 250° C. The product was insoluble in a mixture of refluxing toluene, butanol and isopropanol (1:2:1, v/v/v) which dissolves substantially all dimer-based polyamides, including precursors and uncured resins.

Samples for tensile testing were prepared according to the method described in Example 1 (a). These samples were then placed, at a distance of ten inches, under a Dymax Light-Welder PC-2 with a UV-B filter and allowed to cure for six minutes. The samples were turned over and cured for an additional six minutes. The samples were then tested according to ASTM D-638 as described in Example 1 (a). The results of the tensile tests performed on the cured samples are set forth in Table 1.

TABLE 1

Strength Properties of Precursor, Uncured Michael Addition Product, and Cured Michael Addition Product

| Resin (Example no.) | Tensile Stress at Break (psi) | Tensile Strain at Break (%) | Softening Point (°C.) |
|---|---|---|---|
| Precursor, Ex. 1 (a) | 1412 | 370 | 117 |
| Uncured resin, Ex. 6 | 1005 | 105 | 114 |
| Cured resin, Ex. 9 | 2021 | 300 | Non-melting* |
| Cured resin, Ex. 15 | 1271 | 234 | Non-melting* |

*Up to 220° C.

Examples 16 to 24

A thin film (60 mil) of the resin prepared in Examples 6 to 14 was cured at a distance of ten inches under a Dymax Light-Welder PC-2 with a UV-B filter for six minutes. After this UV exposure, the film did not melt when heated to 250° C. The product was insoluble in a mixture of refluxing toluene, butanol and isopropanol (1:2:1, v/v/v) which dissolves substantially all dimer-based polyamides, including precursors and uncured resins. Example 16 corresponds to the cured version of Example 6. Example 17 corresponds to the cured version of Example 7. Example 18 corresponds to the cured version of Example 8. Example 19 corresponds to the cured version of Example 9. Example 20 corresponds to the cured version of Example 10. Example 21 corresponds to the cured version of Example 11. Example 22 corresponds to the cured version of Example 12. Example 23 corresponds to the cured version of Example 13. Example 24 corresponds to the cured version of Example 14.

Example 25

A wire was coated and cured by an in-line process which involved passing a 21 gauge wire through a 14-foot oven at 180° C., followed by an applicator. The coated wire was exposed to UV curing lamps, and the resulting wire was wound on a reel. The applicator contained a reservoir of the polyamide prepared in Example 6 and had both a back die (to line up the wire) and a front die to control coating thickness. The reservoir was heated to 166° C. and was kept filled from a Meltex hot melt unit that maintained the polyamide (Example 6) at 155° C., and had a connecting hose at 166° C. Two UV curing lamps were used in series and were Fusion Systems' DRF-G Optical Fiber Curing Systems. After exposure under the UV lamps, the wire was water cooled and air dried. The process was run with a wire speed of 200 feet per minute. The coated wire had a diameter of 0.03015 inch and an uncoated diameter of 0.02811 inch. This coated wire had a dielectric constant of 4110 volts and 10 faults per 100 feet at 1000 volts.

Example 26

A wire was coated and cured twice by an in-line process which involved passing a 21 gauge wire through a 14-foot oven at 160° C., followed by an applicator. The coated wire was exposed to UV curing lamps and passed through the oven again, followed by an applicator. The wire was exposed a second time to UV curing lamps and was wound up on a reel. The applicators contained a reservoir of the polyamide prepared in Example 6 and had both a back die (to line up the wire) and a front die to control coating thickness. The reservoir was heated to 166° C. and was kept filled from a Meltex hot melt unit that maintained the polyamide (Example 6) at 155° C., and had a connecting hose at 166° C. Two UV curing lamps were used in series and were Fusion Systems' DRF-G Optical Fiber Curing Systems. After exposure under the UV lamps, the wire was water cooled and air dried. The process was run with a wire speed of 250 feet per minute. The coated wire had a diameter of 0.03010 inch and an uncoated diameter of 0.02813 inch. This coated wire had a dielectric constant of 4500 volts and 8 faults per 100 feet at 1000 volts.

The disclosures of each patent, patent application and publication cited or described in this document are hereby incorporated by reference, in their entirety.

Various modifications of the invention, in addition to those described herein, will be apparent to those skilled in the art from the foregoing description. Such modifications are also intended to fall within the scope of the appended claims.

What is claimed:

1. A method for electrically insulating a conductive wire comprising:

(a) coating a conductive wire with an insulating material which comprises a substantially solvent-free curable acrylate-modified aminoamide resin; and (b) curing said resin to provide the insulated wire with a smooth and tack-free surface.

2. A method according to claim 1 wherein said resin comprises a Michael addition reaction product of a polyamide and a polyol ester having a multiplicity of acrylate ester groups.

3. A method according to claim 2 wherein said Michael addition reaction further comprises reacting with said polyol ester a mono- or disubstituted amine-containing reactive diluent of about 10 to about 44 carbon atoms.

4. A method according to claim 3 wherein said reactive diluent is selected from the group consisting of stearylamine, tallowamine, distearylamine, ditallowamine, dihydrogenated tallowamine, tallowaminopropylamine and dimer diamine.

5. A method according to claim 2 wherein said polyamide is derived from dimer acid.

6. A method according to claim 5 wherein said polyamide is derived from dimer acid, a linear dibasic acid and a linear, branched or cyclic aliphatic amine.

7. A method according to claim 2 wherein said polyol ester is selected from the group consisting of trimethylolethane triacrylate, trimethylolpropane triacrylate, ethoxylated trimethylolpropane triacrylate, trimethylolpropane trimethacrylate, pentaerythritol triacrylate, pentaerythritol tetraacrylate, pentaerythritol trimethacrylate and pentaerythritol tetramethacrylate.

8. A method according to claim 2 wherein said polyamide has a softening point above about 50° C.

9. A method according to claim 8 wherein said polyamide has a softening point from about 75° C. to about 200° C.

10. A method according to claim 9 wherein said polyamide has a softening point from about 95° C. to about 150° C.

11. A method according to claim 1 wherein said curing comprises photocuring.

12. A method according to claim 11 wherein said photocuring comprises UV curing.

13. A method according to claim 1 wherein step (a) comprises coating said wire with a thin coating of insulating material.

14. An electrically insulated conductive wire prepared according to claim 1.

15. A method for the preparation of an electrically insulated conductive wire having a smooth and tack-free surface, wherein the method comprises:

(a) providing a conductive wire; and (b) coating said conductive wire with an insulating material which comprises a substantially solvent-free curable acrylate-modified aminoamide resin.

16. A method according to claim 15 wherein said acrylate-modified aminoamide resin comprises a Michael addition reaction product of a polyamide and a polyol ester having a multiplicity of acrylate ester groups.

17. A method according to claim 16 wherein said Michael addition reaction further comprises a mono- or disubstituted amine-containing reactive diluent of about 10 to about 44 carbon atoms.

18. A method according to claim 16 wherein said polyamide has a softening point above about 50° C.

19. A method according to claim 18 wherein said polyamide has a softening point from about 75° C. to about 200° C.

20. A method according to claim 19 wherein said polyamide has a softening point from about 95° C. to about 150° C.

21. An electrically insulated conductive wire prepared by the process of claim 15.

22. A method for the preparation of an electrically insulated conductive wire according to claim 15 wherein step (b) comprises:

(i) coating said wire with said curable acrylate-modified aminoamide resin; and (ii) curing said resin.

23. A method according to claim 22 wherein said coating step (i) is conducted neat.

24. A method according to claim 22 wherein said curing step (ii) comprises photocuring.

25. A method according to claim 24 wherein said photocuring comprises UV curing.

26. An electrically insulated conductive wire prepared by the process of claim 22.

27. An electrically insulated conductive wire prepared according to claim 15.

28. An electrically insulated conductive wire comprising a conductive wire covered with an insulating material which comprises a substantially solvent-free acrylate-modified aminoamide resin, wherein the surface of the insulated wire is smooth and tack-free.

29. A wire according to claim 28 wherein said resin comprises a Michael addition reaction product of a polyamide with a polyol ester having a multiplicity of acrylate ester groups.

30. A wire according to claim 29 wherein said Michael addition reaction further comprises a mono- or disubstituted amine-containing reactive diluent of about 10 to about 44 carbon atoms.

31. A wire according to claim 29 wherein said polyamide has a softening point above about 50° C.

32. A wire according to claim 31 wherein said polyamide has a softening point from about 75° C. to about 200° C.

33. A wire according to claim 32 wherein said polyamide has a softening point from about 95° C. to about 150° C.

34. A wire according to claim 28 which is an electrically insulated magnet wire.

35. A wire according to claim 28 wherein said coating comprises a high dielectric strength.

36. A wire according to claim 28 wherein said coating is substantially heat-resistant.

37. An electrically insulated conductive wire according to claim 28 wherein said insulating material is coated on said wire in a thickness of no greater than about 20% of the diameter of the uncovered conductive wire.

* * * * *